(12) United States Patent
Apte et al.

(10) Patent No.: US 9,760,396 B2
(45) Date of Patent: *Sep. 12, 2017

(54) MANAGING A SERVER TEMPLATE

(71) Applicant: BMC SOFTWARE, INC., Houston, TX (US)

(72) Inventors: Sujit Apte, Pune (IN); Abhay Ghaisas, Pune (IN)

(73) Assignee: BMC Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,860

(22) Filed: Nov. 29, 2016

(65) Prior Publication Data

US 2017/0083357 A1 Mar. 23, 2017

Related U.S. Application Data

(63) Continuation of application No. 14/789,627, filed on Jul. 1, 2015, now Pat. No. 9,519,504, which is a continuation of application No. 13/840,053, filed on Mar. 15, 2013, now Pat. No. 9,098,322.

(51) Int. Cl.
*G06F 9/455* (2006.01)
*G06F 9/445* (2006.01)

(52) U.S. Cl.
CPC ............ *G06F 9/45558* (2013.01); *G06F 8/65* (2013.01); *G06F 9/45533* (2013.01); *G06F 2009/45562* (2013.01); *G06F 2009/45575* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| 9,098,322 | B2 | 8/2015 | Apte et al. | |
|---|---|---|---|---|
| 2007/0234302 | A1 | 10/2007 | Suzuki et al. | |
| 2008/0163210 | A1 | 7/2008 | Bowman et al. | |
| 2008/0263258 | A1 | 10/2008 | Allwell et al. | |
| 2009/0300076 | A1* | 12/2009 | Friedman | G06F 11/3664 |
| 2009/0300607 | A1* | 12/2009 | Ferris | G06F 9/45558 718/1 |
| 2010/0011227 | A1 | 1/2010 | Govindan et al. | |
| 2010/0050171 | A1 | 2/2010 | Liang et al. | |

(Continued)

OTHER PUBLICATIONS

Notice of Allowance for U.S. Appl. No. 14/789,627, mailed on Aug. 1, 2016, 9 pages.

(Continued)

*Primary Examiner* — Dong Kim
(74) *Attorney, Agent, or Firm* — Brake Hughes Bellermann LLP

(57) ABSTRACT

A non-transitory computer-readable storage medium may comprise instructions for managing a server template stored thereon. When executed by at least one processor, the instructions may be configured to cause at least one computing system to at least convert the server template to a corresponding virtual machine, manage the corresponding virtual machine, and convert the corresponding virtual machine back into a template format.

20 Claims, 6 Drawing Sheets

(56) References Cited

U.S. PATENT DOCUMENTS

| | | |
|---|---|---|
| 2011/0004676 A1* | 1/2011 | Kawato .............. G06F 9/5044 709/221 |
| 2011/0246778 A1 | 10/2011 | Duane et al. |
| 2011/0246984 A1 | 10/2011 | Sharp et al. |
| 2011/0276963 A1 | 11/2011 | Wu et al. |
| 2011/0296412 A1 | 12/2011 | Banga et al. |
| 2012/0066677 A1 | 3/2012 | Tang |
| 2012/0089666 A1 | 4/2012 | Goswami et al. |
| 2012/0089972 A1 | 4/2012 | Scheidel et al. |
| 2013/0031548 A1 | 1/2013 | Kurozumi |
| 2013/0042239 A1 | 2/2013 | Mousseau et al. |
| 2013/0074072 A1 | 3/2013 | Kennedy et al. |
| 2013/0132950 A1 | 5/2013 | McLeod et al. |
| 2013/0297769 A1* | 11/2013 | Chang .............. G06F 9/45558 709/224 |
| 2013/0326503 A1 | 12/2013 | De et al. |
| 2014/0282519 A1 | 9/2014 | Apte et al. |
| 2015/0301851 A1 | 10/2015 | Apte et al. |

OTHER PUBLICATIONS

"Quick Start Guide", VMware vCenter™ Protect 8.0, Virtual Machine, 2008, 28 Pages.

U.S. Appl. No. 13/840,053, "Notice of Allowance Received", Mar. 25, 2015, 16 pages.

U.S. Appl. No. 14/789,627, "Final Office Action Received", Apr. 13, 2016, 43 pages.

U.S. Appl. No. 14/789,627, "Non Final Office Action Received", Dec. 1, 2015, 39 Pages.

* cited by examiner

| Server Number | Type |
|:-:|:-:|
| 0 | Server |
| 1 | Server |
| 2 | Template |
| 3 | Template |
| 4 | Server |
| 5 | Server |
| 6 | Server |
| 7 | Server |
| 8 | Server |
| 9 | Server |
| 10 | Template |
| 11 | Template |
| 12 | Server |
| 13 | Server |
| 14 | Server |
| 15 | Server |

FIG.5

MANAGING A SERVER TEMPLATE

CROSS-REFERENCE TO RELATED APPLICATION

This application is a continuation of U.S. application Ser. No. 14/789,627, filed Jul. 1, 2015, entitled "Managing a Server Template", which is a continuation of and claims priority to U.S. application Ser. No. 13/840,053, filed Mar. 15, 2013, entitled "Managing a Server Template", the contents of both of which are hereby incorporated by reference in their entirety.

TECHNICAL FIELD

This description relates to virtual machines and templates.

BACKGROUND

In cloud computing environments, templates may be used to create virtual machines. It can be desirable to perform management tasks on the templates.

SUMMARY

According to one general aspect, a non-transitory computer-readable storage medium may comprise instructions for managing a server template stored thereon. When executed by at least one processor, the instructions may be configured to cause at least one computing system to at least convert the server template to a corresponding virtual machine, manage the corresponding virtual machine, and convert the corresponding virtual machine back into a template format.

According to one general aspect, a non-transitory computer-readable storage medium may comprise instructions for managing a server template stored thereon. When executed by at least one processor, the instructions may be configured to cause at least one computing system to at least determine that the first server is a template-type server, based on determining that the first server is a template-type server, determine whether a management resource pool has sufficient resources available to convert the first server from a template-type server to a first virtual machine, based on determining that the management resource pool does not have sufficient resources available to convert the first server from the template-type server to the first virtual machine, free up capacity in the management resource pool by removing an other virtual machine from the management resource pool, after freeing up capacity in the management resource pool, convert the first server to a first virtual machine, the first virtual machine corresponding to the first server, after converting the first server to the first virtual machine, manage the first virtual machine, after managing the first virtual machine, convert the first virtual machine back to the first template-type server, determine that the second server is a template-type server, based on determining that the second server is a template-type server, determine whether the management resource pool has sufficient resources available to convert the second server from a template-type server to a second virtual machine, based on determining that the management resource pool does have sufficient resources, convert the second server to a second virtual machine, the second virtual machine corresponding to the second server, after converting the second server to the second virtual machine, manage the second virtual machine, after managing the second virtual machine, convert the second virtual machine back to the second template-type server, determine that the third server is not a template-type server, and manage the third server.

According to another general aspect, a computer-implemented method may include converting a server template to a corresponding virtual machine, managing the corresponding virtual machine, and converting the corresponding virtual machine back into a template format.

The details of one or more implementations are set forth in the accompanying drawings and the description below. Other features will be apparent from the description and drawings, and from the claims.

BRIEF DESCRIPTION OF THE DRAWINGS

FIG. 5 shows a list of servers according to an example implementation.

DETAILED DESCRIPTION

Templates may be used to create virtual machines across multiple hypervisors. The virtual machines may be software implementations of machines or computers that run on a server. Multiple virtual machines may run on a single server; each virtual machine may have its own operating system and act as a distinct machine or computer. A hypervisor may manage the multiple virtual machines running on the single server. As described herein, an administrator may manage the virtual machines created based on templates by treating the template(s) as servers and/or as virtual machines. By managing and keeping the templates updated, the administrator can use the updated template(s) to create virtual machines. The administrator may perform server provisioning tasks on the template, updating the template and treating the template like a server.

To enable treating and/or managing the template as a server, a virtualization manager may convert the template into a virtual machine. The virtualization manager may assign a resource pool to the virtual machine and customize the virtual machine in accordance with specifications of the template. The virtualization manager, and/or another server such as a server automation manager and/or hypervisor, may perform management tasks on the template that has been converted into the virtual machine. The management tasks may include, for example, taking a snapshot of the server status at periodic intervals and auditing the changes, performing regulatory policy-based compliance on the server and remediating the virtual machine and correcting the template if the server is found to be non-compliant, copying files to the virtual machine and installing the files, performing patch analysis and installing needed patches, gathering information about the template and displaying the gathered information in a browser, and converting the virtual machine back to the updated template.

Hypervisors and/or virtualization managers and server automation managers that support creating virtual machines based on templates may manage the templates that are converted into virtual machines. The templates may be converted and managed, including updating the templates, periodically. The hypervisors, virtualization managers, and/or server automation managers may thereby manage the templates like servers.

Figure 1A:
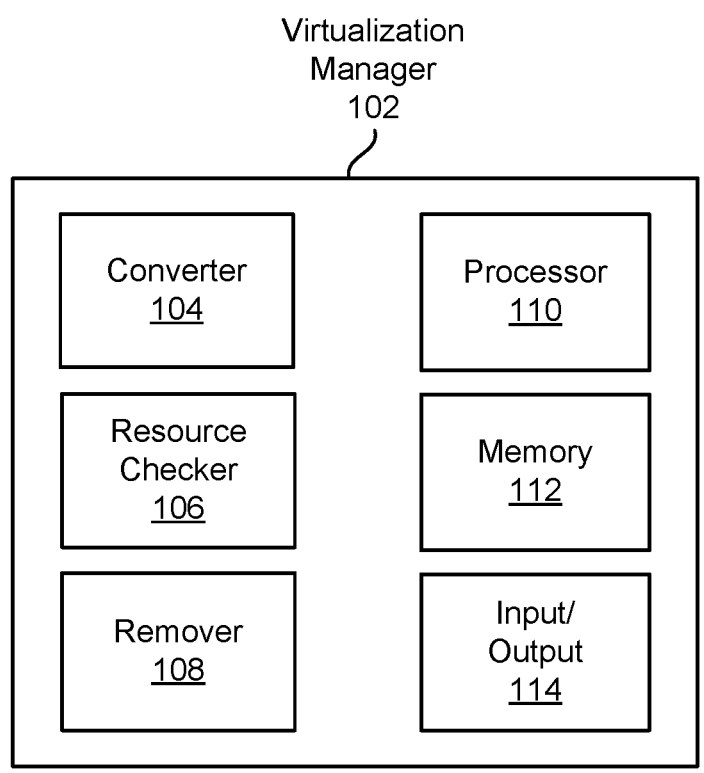
FIG. 1A is a diagram of a virtualization manager according to an example implementation.

FIG. 1A is a diagram of a virtualization manager 102 according to an example implementation. The virtualization manager 102 may support the virtual machines and templates. The templates may be created as virtual machines; the virtual machines, whether created based on a template or not, may run on hypervisors. The virtualization manager 102 may manage changes to virtual machines and template-type servers. The template-type servers may also be referred to as 'server templates' herein. The virtualization manager 102 may convert server templates to corresponding virtual machines, manage the corresponding virtual machines, and convert the corresponding virtual machines back into server templates. The virtualization manager 102 may, for example, convert server templates to corresponding virtual machines by making copies of the server templates and adding identification information to the copies. The virtualization manager 102 may convert the corresponding virtual machine back into the server template by removing the identification information from the copy, and deleting the original server template, according to an example implementation.

The virtualization manager 102 may perform functions with respect to server templates, such as converting the server templates to the corresponding virtual machines and converting the corresponding virtual machine back into the server templates. While FIG. 1A shows various modules included in a single virtualization manager 102, this is merely an example. Some or all of the functions and processes described with respect to the virtualization manager 102, as well as a server automation manager 116 shown in FIG. 1B, may be performed by a single computing system, or may be distributed and/or performed by other computing systems.

The virtualization manager 102 may include a converter 104. The converter 104 may convert server templates to corresponding virtual machines and back into server templates. The converter 104 may convert a server template to a corresponding virtual machine by, for example, adding identification information to a server template and/or to a copy of the server template. In the example in which the converter 104 adds identification information to a copy of the server template, the converter 104 may copy the server template and add the identification information to the copy after copying the server template.

Figure 2A:
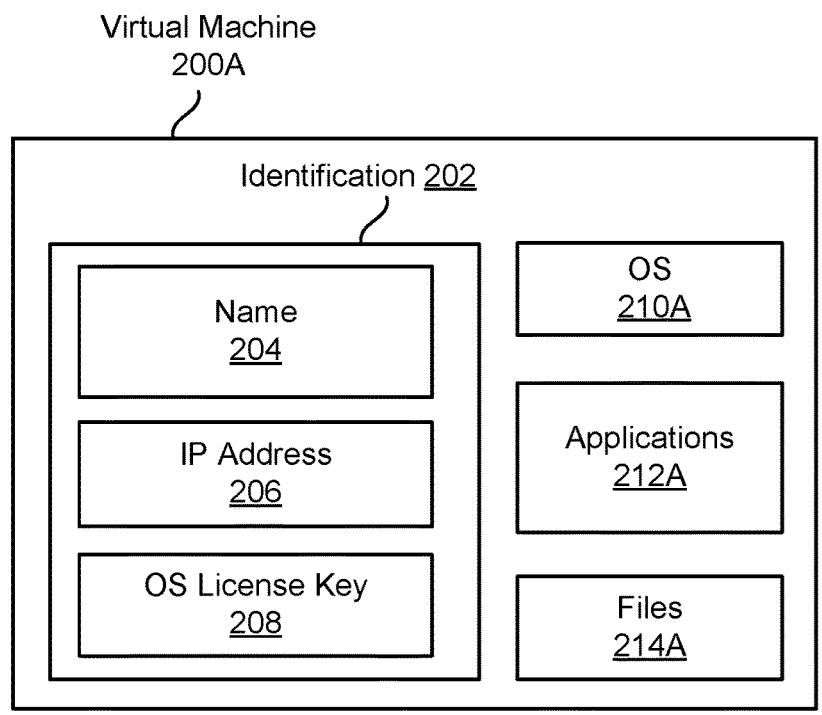
FIG. 2A is a diagram of a virtual machine according to an example implementation.

FIG. 2A is a diagram of a virtual machine 200A according to an example implementation. The virtual machine 200A may act as a machine and/or computing device running within a server. The virtual machine 200A may include identification information 202. The converter 104 shown in FIG. 1A may have added the identification information to the server template and/or the copy of the server template as part of the conversion from the server template to the virtual machine. The identification information 202 may include, for example, a name 204 of the virtual machine 200A, an internet protocol (IP) address 206 of the virtual machine 200A, and an operating system license key 208. The virtual machine 200A may also include an operating system 210A, applications 212A running on the virtual machine 200A, and files 214A included in or stored on the virtual machine 200A.

Figure 2B:
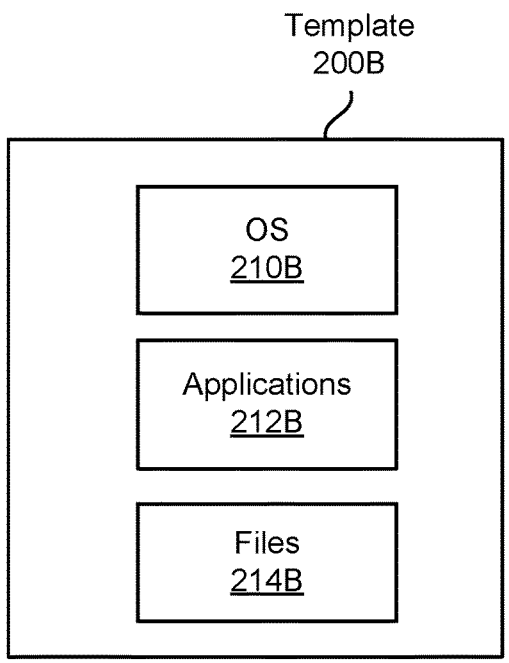
FIG. 2B is a diagram of a template according to an example implementation.

The converter 104 may also convert the corresponding virtual machine back to the server template by removing identification information from the server template or from the corresponding virtual machine. The identification information may also be left in the server template and remain unused after the corresponding virtual machine has been converted back to the server template. FIG. 2B is a diagram of a template 200B according to an example implementation. In this example, in which the identification information has been removed, the template 200B, either before conversion to the virtual machine or after conversion from the virtual machine, may be similar to the virtual machine 200A but not include the identification information 202. The template 200B may include, for example, an operating system 210B, applications 212B running on the template 200B, and files 214B stored on the template 200B.

Creation of a virtual machine corresponding to a template may require computing resources, such as processing capacity and/or access to microprocessor functions, memory, and communication (input and/or output) nodes. The virtualization manager 102 may create the virtual machine(s) with computing resources managed by or included in the virtualization manager 102, may determine whether sufficient computing resources are available to create the virtual machine(s), and/or may free up computing resources such as by removing other virtual machines.

Returning to FIG. 1A, the virtualization manager 102 may also include a resource checker 106. The resource checker 106 may check and/or analyze the computing resource usage in a resource pool, shown and described with respect to FIG. 3, managed by the virtualization manager 102. In some implementations, the resource checker 106 may check and/or analyze the computing resource usage in response to a request from a resource manager 132 included in the server automation manager 116 shown in FIG. 1B. The resource checker 106 may add the actual computing resource usage of some or all virtual machines and/or server templates accessing the resource pool, may add the computing resources reserved for some or all of the virtual machines and/or server templates reserving resources of the resource pool, or determine usage of the computing resources of the resource pool based on a function of both actual use and reservation of the computing resources of the resource pool. Based on determining the usage of the computing resources of the resource pool, the resource checker 106 may determine whether sufficient computing resources exist in the resource pool to create a new virtual machine based on a server template. The resource checker 106 may send a message to the resource manager 132 indicating whether sufficient computing resources exist in the resource pool.

If sufficient resources do exist in the resource pool, then the converter 104 may create the new virtual machine and/or convert the server template into the corresponding virtual machine. If sufficient resources do not exist in the resource pool, then the virtualization manager 102 may need to remove or delete one or more existing virtual machines from the resource pool. The virtualization manager 102 may remove or delete the one or more existing virtual machines in response to an instruction from the server automation manager 116. The existing virtual machine(s) to be removed or deleted may be a virtual machine created based on a template so that the server automation manager 116 could perform management tasks on the virtual machine. In an example implementation, the virtualization manager 102 should not remove or delete a virtual machine in production use.

The virtualization manager 108 may also include a remover 108. The remover 108 may remove virtual machines from the resource pool. The remover 108 may remove virtual machines if, for example, the resource checker 106 determines that the resource pool lacks sufficient resources to create a new virtual machine, and/or in response to an instruction from the server automation manager 116 to remove or delete a virtual machine. For example, if a virtual machine is to be created based on a server template (and/or the server template is to be converted into a corresponding virtual machine), but the resource pool lacks sufficient resources to create the new virtual machine, the remover 108 may remove and/or delete a currently existing virtual machine from the resource pool, freeing computing resources in the resource pool for the new virtual machine.

When performing management tasks on servers, the virtualization manager 102 may perform different processes or functions on the servers based on the type of server. For example, if the server is a template-type server or server template, the virtualization manager 102 may convert the server template into a corresponding virtual machine before the server automation manager 116 performs the management tasks, and convert the corresponding virtual machine back into a template server after the server automation manager 116 performs the management tasks. If the server is not a template-type server, the server automation manager 116 may perform the management tasks without the virtualization manager 102 performing any conversion.

The virtualization manager 102 may include at least one processor 110. The at least one processor 110 may include one or more processors with one or multiple cores capable of performing functions and executing instructions, such as the functions and processes described herein.

The virtualization manager 102 may also include at least one memory 112. The at least one memory 112 may store data and/or instructions, such as instructions for performing the functions and processes described herein. The memory 112 may store, for example, instructions that, when executed by the at least one processor 110, cause a computing system such as the virtualization manager 102 to perform the functions and processes described herein. The memory 112 may also store data, such as data describing the templates and virtual machines described herein.

The virtualization manager 102 may also include an input/output device 114. The input/output device 114 may send and receive information from and to the virtualization manager 102. The input/output device 114 may include separate devices, with one or more devices for input and one or more devices for output, or may be combined into a single device. The input/output device 114 may include multiple interfaces. For example, input/output device 114 may include a keyboard and mouse for user input, and may include a wired or wireless communication interface for receiving signals from one or multiple computing devices. The input/output device 114 may also include a display or monitor as well as a wired or wireless communication interface for sending signals to one or multiple computing devices, such as servers, templates, and/or virtual machines. The input/output device 114 may also communicate with virtual machines existing on a same computing system as the virtualization manager 102 by passing messages to the virtual machines, according to an example implementation.

Figure 1B:
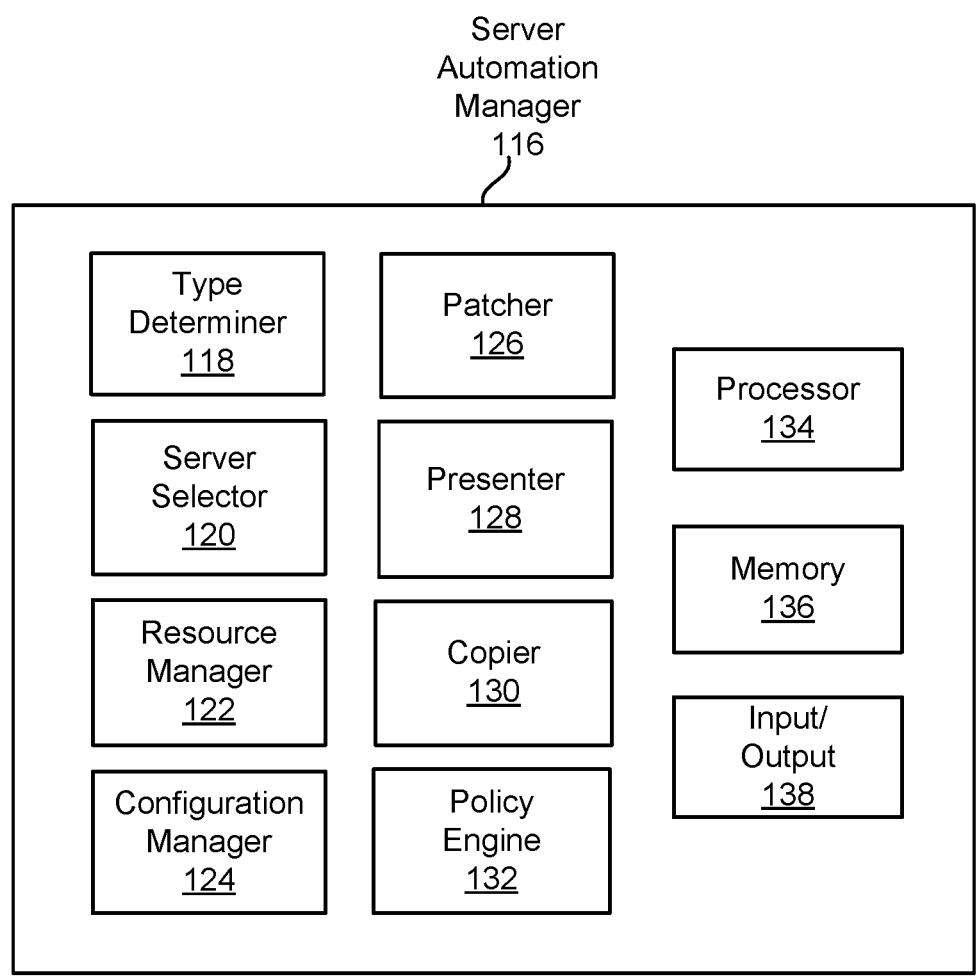
FIG. 1B is a diagram of a server automation manager according to an example implementation.

FIG. 1B is a diagram of the server automation manager 116 according to an example implementation. The server automation manager 116 may perform management tasks on the servers. The server automation manager 116 may also determine whether the servers are template-type servers or server templates, and instruct the virtualization manager 102 to convert a server template to a virtual machine if the server automation manager 116 determines that the server is a template-type server or server template.

The server automation manager 116 may include a type determiner 118. The type determiner 118 may determine whether a server is a server template or a virtual machine. The type determiner 118 may determine whether the server is a server template or a virtual machine based on fields or data stored in or associated with the server, or based on a list of servers. The list of servers may indicate a type for each server in the list, such as template-type or virtual machine. An example of a list of servers indicating the type for each server is shown in FIG. 5. The virtualization manager 102 may perform type conversion, as well as creating a copy of the server and later removing the original server, based on the type determiner 118 of the server automation manager 116 determining that the server is a template-type server, before the server automation manager 116 performs management tasks, or the server automation manager 116 may simply perform the management tasks without performing any conversion based on the type determiner 118 determining that the server is not a template-type server, according to example implementations.

The server automation manager 116 may also include a server selector 120. The server selector 120 may select a server upon which the virtualization manager 102 will perform functions, such as type determination, conversion, management, and/or removal. The server selector 120 may select the server in sequential order based on a queue or list, such as the list shown in FIG. 5, or may select the server based on priority information transmitted to the server selector 120, according to example implementations.

The server automation manager 116 may also include a resource manager 122. The resource manager 122 may send a request to the resource checker 106 of the virtualization manager 102 shown in FIG. 1A to determine whether sufficient resources exist in the resource pool to convert a template to a virtual machine. If the resource checker 106 determines that sufficient resources do not exist, and sends the resource manager 122 a message indicating that sufficient resources do not exist, then the resource manager 122 may, in response to receiving the message indicating that sufficient resources do not exist, send an instruction to the remover 108 of the virtualization manager 102 to remove a virtual machine from the resource pool. The remover 108 may, in response to receiving the instruction to remove a virtual machine from the resource pool, delete or remove a virtual machine from the resource pool as described above with respect to FIG. 1A.

The server automation manager 116 may perform management tasks on the virtual machine and/or server template. The server automation manager 116 may perform management tasks on virtual machines that were not created from templates, and/or may perform management tasks on virtual machines that were created from, correspond to, or were converted from, templates. When the server automation manager 116 performs the management tasks on virtual machines that were created from, correspond to, or were converted from templates, the server automation manager 116 may perform the management tasks after the creation or conversion. The management tasks may include provisioning, patching, presenting, copying, and policy checking, as non-limiting examples.

The server automation manager 116 may include, for example, a configuration manager 124. The configuration manager 124 may perform server provisioning tasks on corresponding virtual machines which were created based on templates. The configuration manager 124 may, for example, set up the corresponding virtual machines for initial use, providing the corresponding virtual machines with identification and authorization information for users to access information stored or accessed by the virtual machines.

The server automation manager 116 may also include a patcher 126. The patcher 126 may patch an operating system and/or application(s) of the server template or virtual machine. The patcher 126 may also determine whether a server template or virtual machine needs a patch to its respective operating system and/or application(s). For example, the patcher 126 may receive an operating system patch release or an application patch release, and information regarding which systems need the patch, from a vendor of the operating system or application. The patcher 126 may determine whether a given virtual machine or server template needs the operating system or application patch. If the patcher 126 determines that the virtual machine or server template does need the operating system or application patch, then the patcher 126 may apply the operating system or application patch to the virtual machine or server template.

The server automation manager 116 may also include a presenter 128. The presenter 128 may present contents of the server template. The presenter 128 may present the contents in a browser. The presenter 128 may, for example, gather information which a user or administrator desires to view or browse, and display the information in the browser. The displayed information may include, for example, computing resources available and/or used by the server template, files or applications stored or installed on the server template, and/or processes running on the server template. By browsing the contents of the server template, an administrator may identify which template to use to create virtual machines.

The server automation manager 116 may also include a copier 130. The copier 130 may copy files and/or new applications into the corresponding virtual machine created based on the template. The copier 130 may, for example, copy files selected by an administrator into the corresponding virtual machine, and install associated programs onto the corresponding virtual machine. The copier 130 may also copy and/or install new applications onto a corresponding virtual machine.

The server automation manager 116 may also include a policy engine 132. The policy engine 132 may perform regulatory tasks on a virtual machine, such as determining whether the virtual machine and/or server template, based on which the virtual machine was created, complies with regulatory and/or policy requirements. The policy engine 132 may, for example, store regulatory requirements, such as data speed, privacy protection requirements, and/or energy usage, and compare the performance and/or processes of the virtual machine or template to the stored regulatory requirements. The policy engine 132 may provide a report of the comparison to an administrator, or may notify the administrator only if the policy engine determines that some regulations and/or policy requirements are not being complied with.

The server automation manager 116 may include at least one processor 134. The at least one processor 134 may include one or more processors with one or multiple cores capable of performing functions and executing instructions, such as the functions and processes described herein.

The server automation manager 116 may also include at least one memory 136. The at least one memory 136 may store data and/or instructions, such as instructions for performing the functions and processes described herein. The memory 136 may store, for example, instructions that, when executed by the at least one processor 134, cause a computing system such as the server automation manager 116 to perform the functions and processes described herein. The memory 136 may also store data, such as data describing the templates and virtual machines described herein.

The server automation manager 116 may also include an input/output device 138. The input/output device 138 may send and receive information from and to the virtualization manager 102. The input/output device 138 may include separate devices, with one or more devices for input and one or more devices for output, or may be combined into a single device. The input/output device 138 may include multiple interfaces. For example, input/output device 138 may include a keyboard and mouse for user input, and may include a wired or wireless communication interface for receiving signals from one or multiple computing devices. The input/output device 138 may also include a display or monitor as well as a wired or wireless communication interface for sending signals to one or multiple computing devices, such as servers, templates, and/or virtual machines. The input/output device 138 may also communicate with virtual machines existing on a same computing system as the server automation manager 116 by passing messages to the virtual machines, according to an example implementation.

Figure 3:
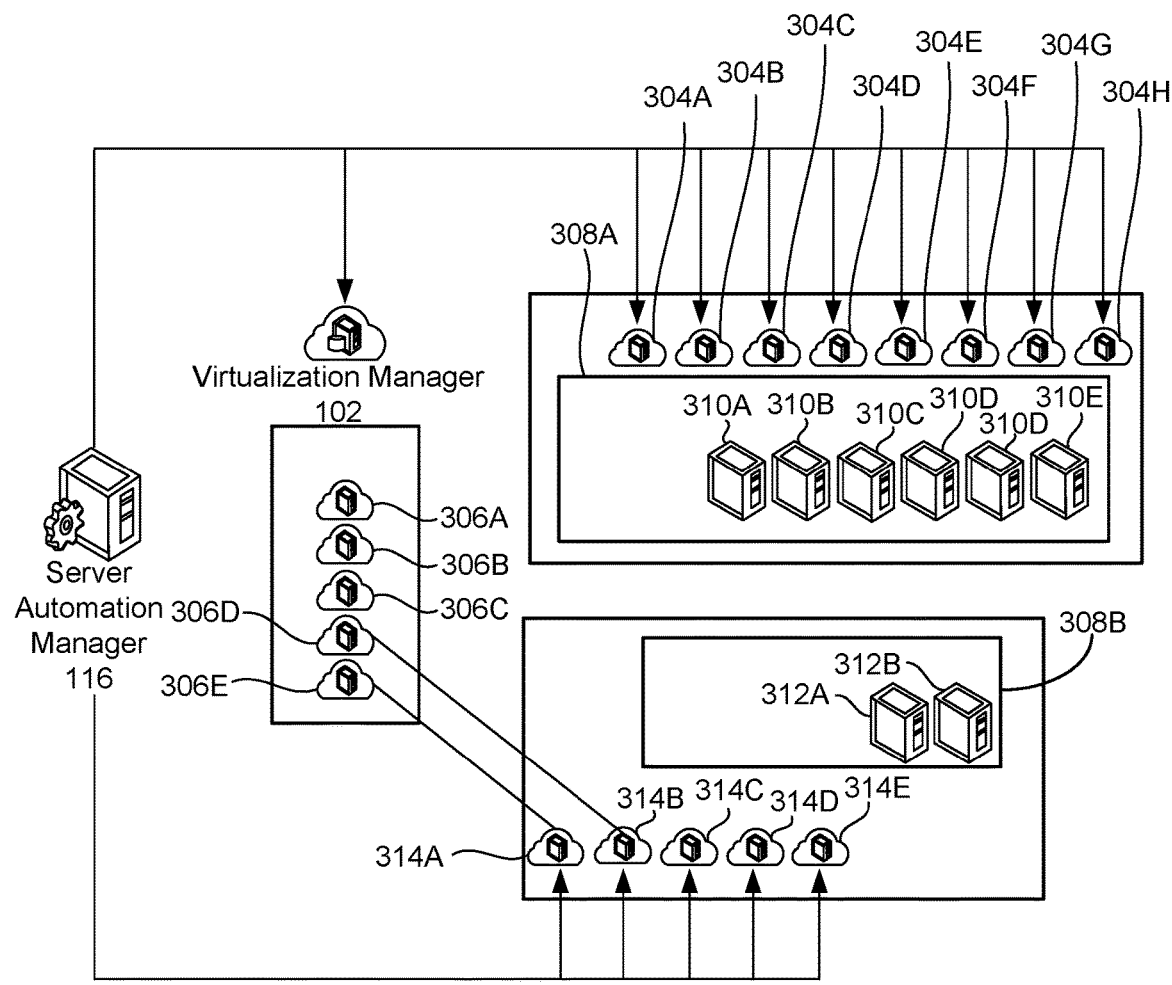
FIG. 3 is a diagram of a system in which conversion and management of templates may be performed according to an example implementation.

FIG. 3 is a diagram of a system in which conversion and management of templates may be performed according to an example implementation. The system may include the virtualization manager 102 which converts templates, such as templates 306A, 306B, 306C, 306D, 306E. The system may also include the server automation manager 116. The server automation manager 116 may perform management functions on servers, such as virtual machines and templates. The system may also include virtual machines, such as virtual machines 304A, 304B, 304C, 304D, 304E, 304F, 304G, 304H. The virtual machines may be running on a single machine, such as the virtualization manager 102.

The virtualization manager 102 may manage resource pool(s) 308A, 308B. The resource pool(s) 308A, 308B may include resources, such as processing capacity and/or access to microprocessor functions, memory, and/or communication (input and/or output) nodes which virtual machines may utilize, and in which virtual machines may be created and in which copies of templates may be made. The resource pool 308B may be created for the purpose of managing the templates 314A, 314B, 314C, 314D, 314E. The resource pool 308B may be limited and may be able to accommodate only a limited number of virtual machines and/or server templates. The resource pool 308B may not have enough resources to accommodate the virtual machines 314A, 314B, 314C, 314D, 314E corresponding to all of the templates 306A, 306B, 306C, 306D, 306E. The virtualization manager 102 may not be able to convert server templates into virtual machines after the resources in the resource pool 308A, 308B have reached a maximum limit or threshold.

The system may also include the resource pools 308A, 308B. The resource pools 308A, 308B may include computing resources, such as processors, memory, and/or communication devices in which the templates and servers may run and perform functions. The resource pools 308A, 308B may access the at least one processor(s) 110, 134, at least one memory 112, 136, and/or input/output device(s) of the virtualization manager 102 and/or server automation manager 116, and/or may access computing resources of one or more other computing devices. The resource pool 308A may store and run a number of virtual machines 310A, 310B, 310C, 310D, 310E, 310F. The resource pool 308B, which may be considered a 'management cache', may store and run a number of corresponding virtual machines 312A, 312B which were created based on the templates 314A, 314B, 314C, 314D, 314E. The virtual machines 312A, 312B representing templates 314A, 314B, 314C, 314D, 314E may have been created based on the templates 306A, 306B, 306C, 306D, 306E.

Figure 4:
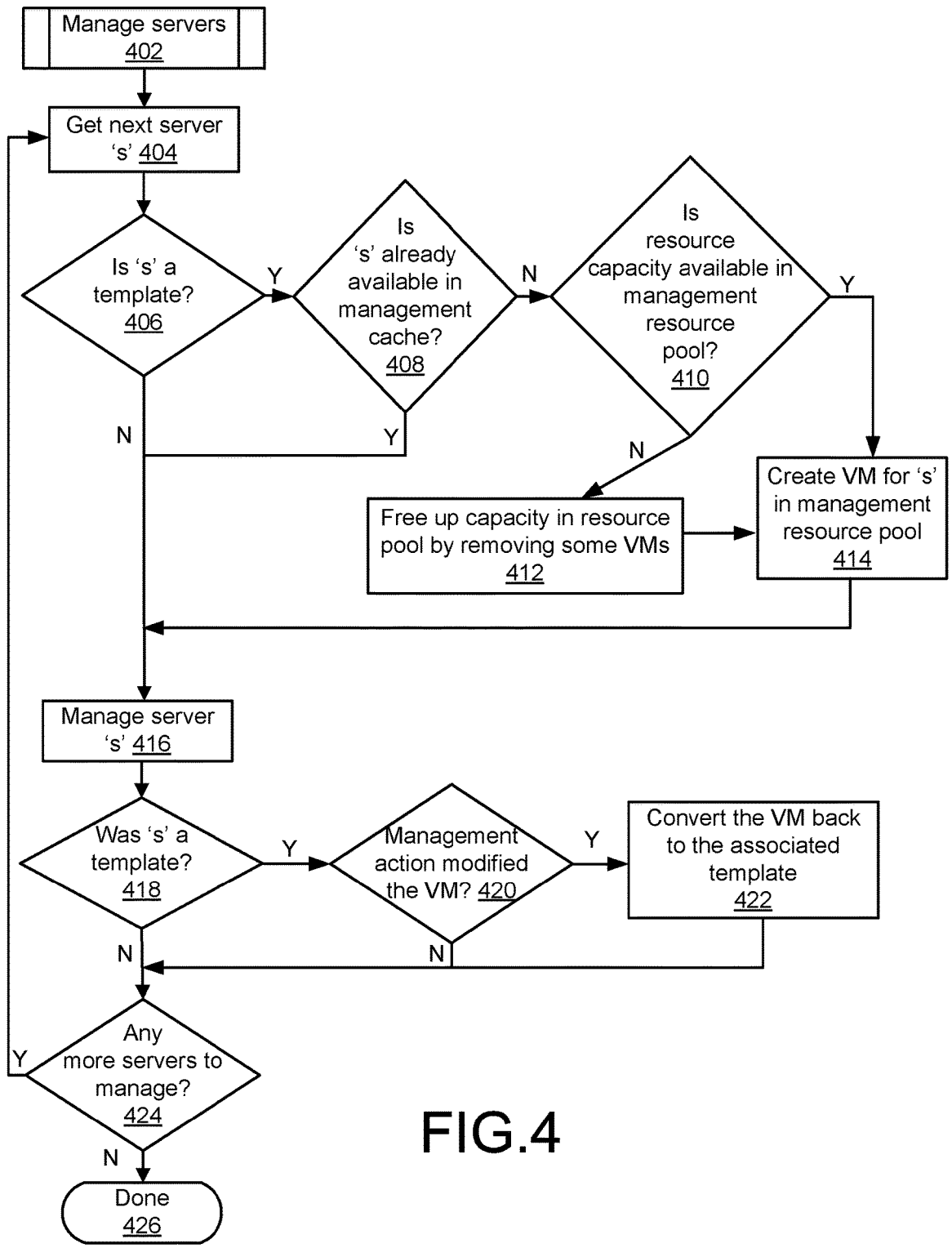
FIG. 4 is a diagram showing a process for managing templates and virtual machines according to an example implementation.

FIG. 4 is a diagram showing a process for managing servers (402), including managing templates and virtual machines, according to an example implementation. The managing may be performed with respect to a set of target servers, which may include a set of virtual machines and templates. The process shown in FIG. 4 may be performed by a single computing device, or distributed among multiple computing devices. In an example implementation, the processes may be distributed between the virtualization manager 102 and the server automation manager 116.

The process may include the server automation manager 116 getting a next server (404). The server automation manager 116 may get the next server (404) by, for example, retrieving a next server on a list such as the list shown in FIG. 5, by selecting a server with a highest priority level, by selecting a server which has been waiting a longest time, based on a combination of priority level and waiting time, or other techniques used to choose a server that needs to be managed.

The process may also include the server automation manager 116 determining whether the server is a template (406). The server automation manager 116 may determine whether the server is a template by checking the list, which may indicate whether the server is a template or is not a template, or by checking fields or data included in or associated with the server. If the server is not a template, then the process may include the server automation manager 116 managing the server (416). Managing the server (416) may include provisioning tasks, patching, presenting contents of the server, copying the server, deploying files, configuration, or applications to the server, and/or determining whether the server complies with policy requirements, according to example implementations.

If the server is a template, then the server automation manager 116 may determine whether the server template is already available and/or cached in management cache (408). The management cache may be considered the resource pool 308B shown in FIG. 3. The management cache may include storage and/or memory which allows the virtualization manager 102 to perform management tasks on a server template without converting the server template into a virtual machine. The management cache may be included, for example, in the at least one memory 112 of the virtualization manager 102, the at least one memory 136 of the server automation manager 116, and/or the resource pool 308B shown in FIG. 1. If the server template is already available in management cache, then the server automation manager 116 may manage the server template (416).

If the server template is not already available in management cache, then the server automation manager 116 may determine whether resource capacity is available in the management resource pool 308A, 308B (410) to convert the server template into a virtual machine. The server automation manager 116 may determine whether resource capacity is available by the resource manager 122 sending a request to the resource checker 106 of the virtualization manager 102. If resource capacity is available in the management pool, then the virtualization manager 102 may convert the server template into a virtual machine by creating a virtual machine based on the server template in the resource pool 308A, 308B (414). Creating the virtual machine may include, for example, making a copy of the template and adding identification information.

If resource capacity is not available in the management resource pool, then the virtualization manager 102 may free up capacity in the resource pool 308A, 308B by removing one or more virtual machines from the resource pool 308A, 308B (412). The virtual machines may be removed by, for example, deleting the virtual machines from the resource pool 308A, 308B. The virtualization manager 102 may determine which virtual machine(s) to remove or delete based, or example, on cache clearing techniques, such as least recently used or randomly. After freeing up capacity in the resource pool by removing some virtual machines, the virtualization manager 102 may create the corresponding virtual machine based on the server template in the management resource pool (414).

After the corresponding virtual machine has been created in the management resource pool, the server automation manager 116 may manage the server (416). At this time the server is a virtual machine. Managing the server (416) may include, for example, performing server provisioning tasks on the server, patching an operating system of the server, presenting or displaying contents of the server in a browser, copying a file into the server, taking a snapshot of the server, and determining whether the server complies with regulatory policy.

After managing the server (416), the server automation manager 116 may determine whether the server was a template (418). The server automation manager 116 may determine whether the server was a template by, for example, checking the list of servers which identifies which servers were templates and which servers were virtual machines (or non-template based servers), or by checking a field or data stored within or associated with the server. If the server was not a template, then the server automation manager 116 may determine whether there are any more servers to manage (424). If there are more servers to manage, then the server automation manager 116 may get the next server (404) and perform the processes described herein on the next server. If there are not more servers to manage, then the process may be considered finished (426).

If the server automation manager 116 determines that the server was a template, then the virtualization manager 102 may convert the server back into the template (422). The server automation manager 116 may determine whether management actions were performed on the corresponding virtual machine (420). If management actions were not performed on the corresponding virtual machine, no further action may need to be performed with respect to the server, and then the server automation manager 116 may determine whether there are any more servers to manage (424). If management actions were performed but did not result in changes to the server, no further action may need to be performed with respect to the server, and then the server automation manager 116 may determine whether there are any more servers to manage (424). If management actions were performed on the corresponding virtual machine which did result in changes to the corresponding virtual machine, then the virtualization manager 102 may convert the virtual machine back to the associated template (422). In the situations in which either no management actions were performed or management actions were performed but did not result in changes to the server, the virtualization manager 102 may optionally still convert the virtual machine back into the associated template (422).

Converting the virtual machine back to the associated template (422) may include the remover 108 of the virtualization manager 102 removing the identification information from the corresponding virtual machine and removing and/or deleting the previous server template maintained by the virtualization manager 302. After the virtualization manager 102 converts the virtual machine back to the associated template, the server automation manager 116 may determine whether there are any more servers to manage (424), and if there are not any more servers to manage, then the process may be considered finished (426).

Servers may be converted and managed serially, or many servers may be converted and managed in parallel and/or at a same time. While FIG. 4 shows processes being performed serially, multiple processes may be performed at a same time in a pipeline technique, and/or a single process may be performed concurrently on multiple servers, according to example implementations.

FIG. 5 shows a list of servers according to an example implementation. The list identifies the servers by number and indicates the type for the servers. The type may include either a non-template based server, which may be a virtual machine or a physical server, or a template-based server. The type determiner 118 shown and described with respect to FIG. 1B may check the list shown in FIG. 5 at (406) and (418) of the process shown and described with respect to FIG. 4 to determine whether a server was a template or a server (such as a non-template based server).

The server automation manager 116 may, for example, determine that server '0' is not a template, manage server '0' without conversion, determine that server '1' is not a template, manage server '1' without conversion, determine that server '2' is a template, determine that the resource pool 308B does not have sufficient resources to convert server '2' into a virtual machine, remove an existing virtual machine from the resource pool 308B, convert server '2' into a virtual machine, manager server '2', determine that server '2' was a template, convert server '2' back into a template, determine that server '3' is a template, determine that sufficient resources are available in the resource pool 308B to convert server '3' into a virtual machine, convert server '3' into a virtual machine without removing any virtual machines from the resource pool 308B, manage server '3', determine that server '3' was a template, convert server '3' back into a template, determine that server '4' is not a template, and manager server '4' without performing any conversion on server '4'. Similar functions and processes may be performed on servers '5' through '15' based on their indicated type.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon for managing a server template that, when executed by at least one processor, are configured to cause at least one computing system to at least:
convert the server template to a corresponding virtual machine, the converting the server template to the corresponding virtual machine including adding identification information to the corresponding virtual machine;
determine that the corresponding virtual machine does not comply with regulatory requirements;
based on determining that the corresponding virtual machine does not comply with regulatory requirements, correct the corresponding virtual machine to comply with the regulatory requirements; and
convert the corresponding virtual machine into an updated server template, the converting the corresponding virtual machine into the updated server template including removing the identification information from the updated server template,
wherein the instructions are configured to cause the at least one computing system to perform all of the converting the server template to the corresponding virtual machine, determining that the corresponding virtual machine does not comply with regulatory requirements, correcting the corresponding virtual machine to comply with regulatory requirements, and converting the corresponding virtual machine into the updated server template, periodically.

2. The non-transitory computer-readable storage medium of claim 1, wherein the instructions are configured to cause the at least one computing system to keep the server template updated including performing the converting the server template to the corresponding virtual machine, determining that the corresponding virtual machine does not comply with regulatory requirements, correcting the corresponding virtual machine to comply with the regulatory requirements, and converting the corresponding virtual machine into the updated server template.

3. The non-transitory computer-readable storage medium of claim 1, wherein the instructions are further configured to cause the at least one computing system to display information about the server template in a browser.

4. The non-transitory computer-readable storage medium of claim 1, wherein the instructions are further configured to cause the at least one computing system to present contents of the server template in a browser.

5. The non-transitory computer-readable storage medium of claim 1, wherein the regulatory requirements include data speed.

6. The non-transitory computer-readable storage medium of claim 1, wherein the regulatory requirements include privacy protection requirements.

7. The non-transitory computer-readable storage medium of claim 1, wherein the regulatory requirements include energy usage.

8. The non-transitory computer-readable storage medium of claim 1, wherein the identification information includes a name of the corresponding virtual machine.

9. The non-transitory computer-readable storage medium of claim 1, wherein the identification information includes an Internet Protocol (IP) address of the corresponding virtual machine.

10. The non-transitory computer-readable storage medium of claim 1, wherein the identification information includes an operating system license key.

11. A method comprising:
converting, by a computing system, a server template to a corresponding virtual machine, the converting the server template to the corresponding virtual machine including adding identification information to the corresponding virtual machine;
determining that the corresponding virtual machine needs a patch to an operating system of the corresponding virtual machine;
based on determining that the corresponding virtual machine needs the patch to the operating system of the corresponding virtual machine, applying the patch to the operating system of the corresponding virtual machine; and
converting the corresponding virtual machine into a patched server template, the converting the corresponding virtual machine into the patched server template including removing the identification information from the patched server template,
wherein all of the converting the server template to the corresponding virtual machine, determining that the corresponding virtual machine needs the patch to the operating system, applying the patch, and converting the corresponding virtual machine into the patched server template, are performed periodically.

12. The method of claim 11, wherein the determining that the corresponding virtual machine needs the patch to the operating system is performed after converting the server template to the corresponding virtual machine.

13. The method of claim 11, further comprising updating the server template based on the determining that the corresponding virtual machine needs the patch to the operating system of the corresponding virtual machine.

14. The method of claim 11, wherein the identification information includes an Internet Protocol (IP) address of the corresponding virtual machine.

15. A method comprising:
converting, by a computing system, a server template to a corresponding virtual machine, the converting the server template to the corresponding virtual machine including adding identification information to the corresponding virtual machine;
determining that the corresponding virtual machine needs a patch to an application running on the corresponding virtual machine;
based on determining that the corresponding virtual machine needs the patch to the application running on the corresponding virtual machine, applying the patch to the application running on the corresponding virtual machine; and
converting the corresponding virtual machine into a patched server template, the converting the corresponding virtual machine into the patched server template including removing the identification information from the patched server template,
wherein all of the converting the server template to the corresponding virtual machine, determining that the corresponding virtual machine needs the patch to the application, applying the patch to the application, and converting the corresponding virtual machine into the patched server template, are performed periodically.

16. The method of claim 15, further comprising copying files selected by an administrator into the corresponding virtual machine.

17. The method of claim 15, further comprising copying a new application to the corresponding virtual machine.

18. The method of claim 15, wherein the identification information includes a name of the corresponding virtual machine.

19. The method of claim 15, wherein the identification information includes an Internet Protocol (IP) address of the corresponding virtual machine.

20. The method of claim 15, wherein the identification information includes an operating system license key.

* * * * *